Sept. 9, 1924.                                                   1,508,026
W. NOBLE
CLUTCH FOR AXIAL TRACTION
Filed March 15, 1919            3 Sheets—Sheet 1
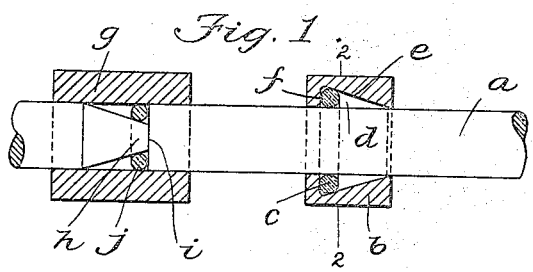
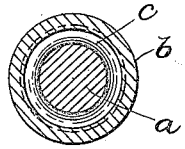
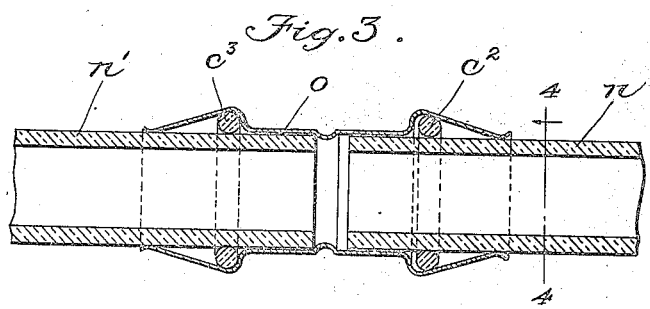
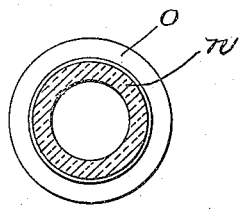
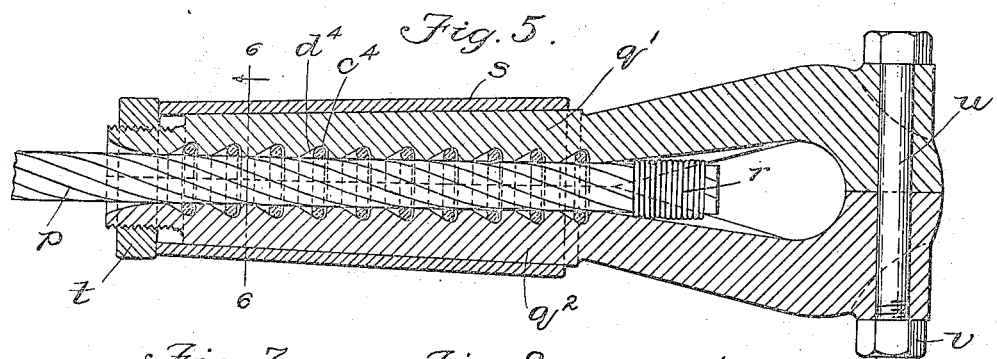
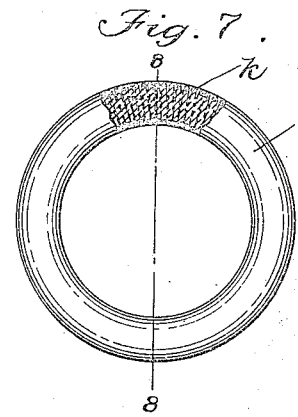
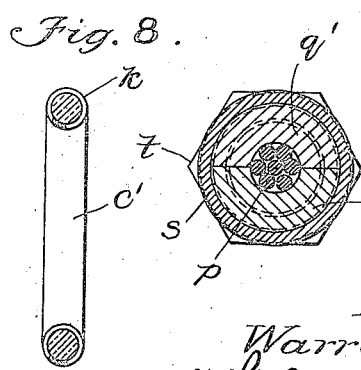
Inventor
Warren Noble
by Wright, Brown, Quinby & May
Attorneys Sept. 9, 1924.  
W. NOBLE  
CLUTCH FOR AXIAL TRACTION  
Filed March 15, 1919  3 Sheets-Sheet 2  
1,508,026
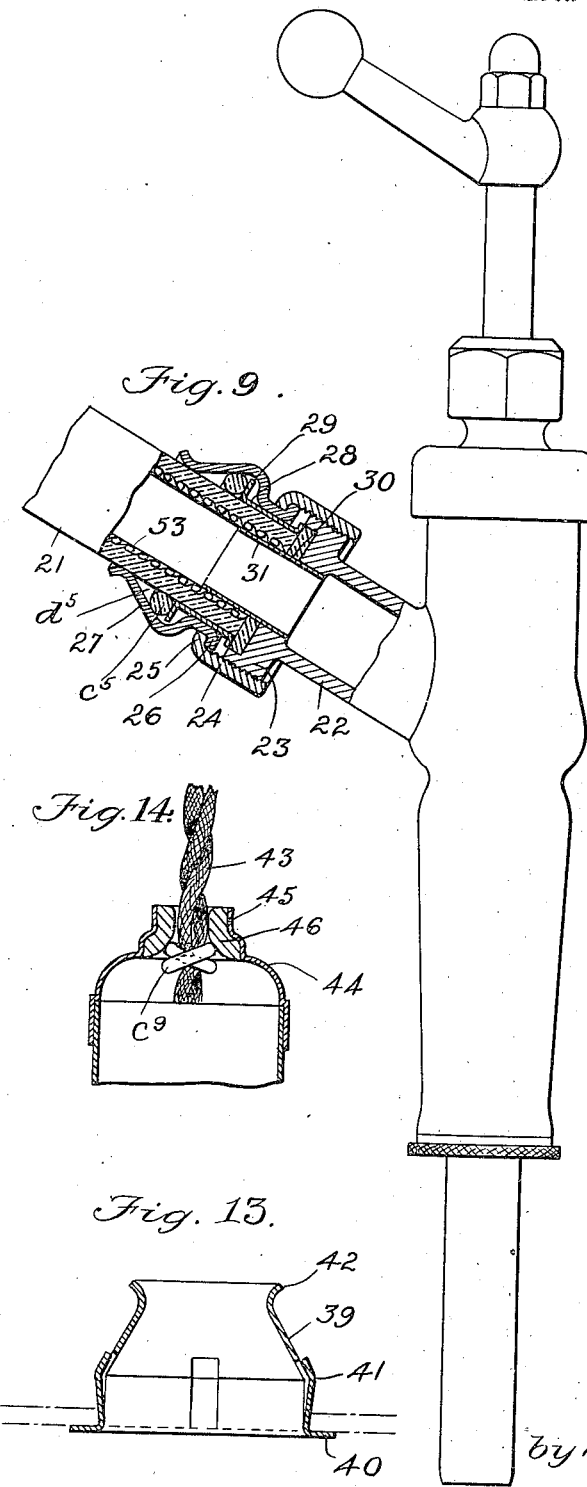
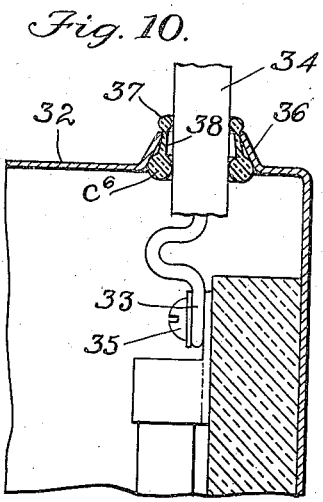
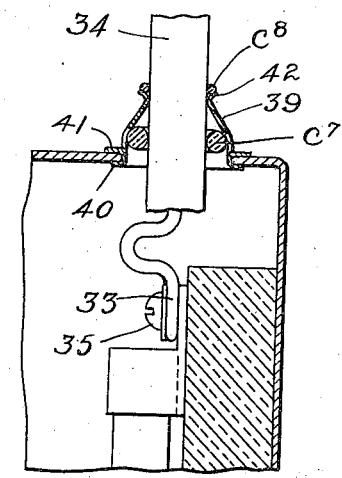
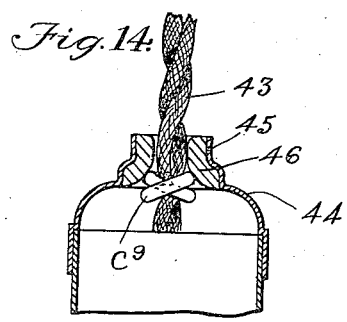
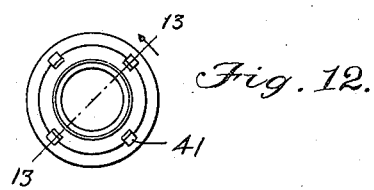
Inventor  
Warren Noble  
by Wright, Brown, Quinby & May  
Attorneys Sept. 9, 1924.

W. NOBLE

CLUTCH FOR AXIAL TRACTION

Filed March 15, 1919      3 Sheets—Sheet 3

1,508,026

Inventor
Warren Noble
by Wright, Brown, Quinby & Hay
Attorneys

Patented Sept. 9, 1924.

1,508,026

UNITED STATES PATENT OFFICE.

WARREN NOBLE, OF PROVIDENCE, RHODE ISLAND, ASSIGNOR TO TUBULAR WOVEN FABRIC COMPANY, OF PAWTUCKET, RHODE ISLAND, A CORPORATION OF RHODE ISLAND.

CLUTCH FOR AXIAL TRACTION.

Application filed March 15, 1919. Serial No. 282,900.

*To all whom it may concern:*

Be it known that I, WARREN NOBLE, a subject of the King of Great Britain, residing at Providence, in the county of Providence and State of Rhode Island, have invented new and useful Improvements in Clutches for Axial Traction, of which the following is a specification.

The present invention relates in and to clutching means, and is particularly concerned with a clutch adapted to connect two coaxial members of which one embraces the other, and to transmit force applied to one of the members in an axial direction. Inasmuch as the invention is applicable to many different and widely varied uses, but in all of its uses acts in essentially the same way, namely, to transmit or resist force applied longitudinally of the coaxial coupled members, I have entitled it comprehensively as a clutch for axial traction. In the following specification I will explain the generic principles with reference to an illustrative few of the many possible uses to which it may be put.

Figure 15:
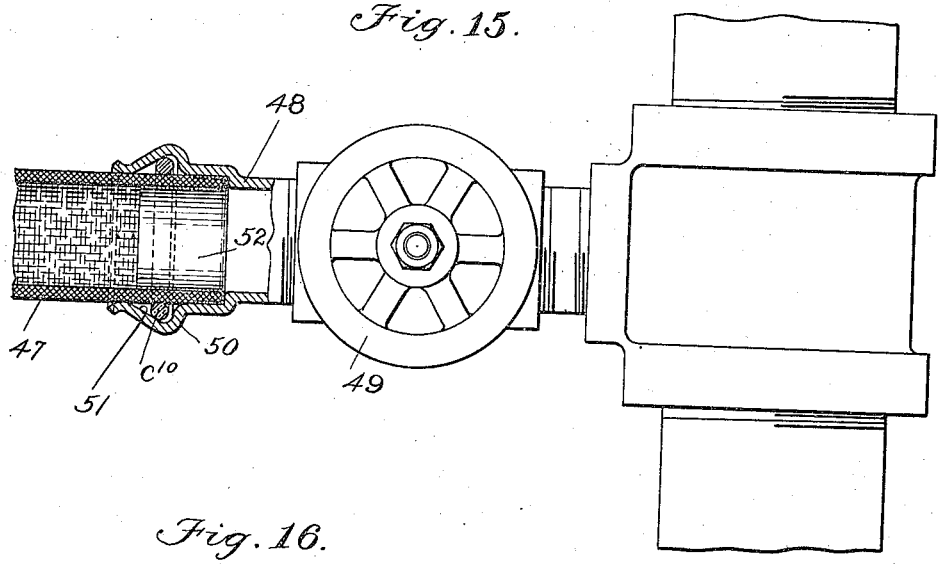
Figure 16:
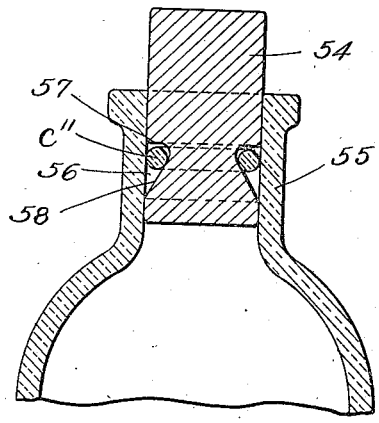
Figure 17:
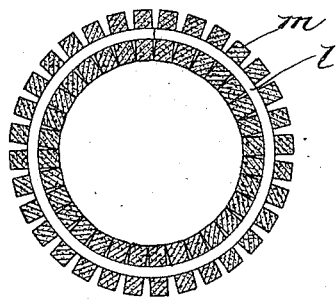
Figure 18:

In the drawings annexed forming a part of this specification, wherein typical embodiments of the invention are shown applied to diverse uses, Figure 1 is a longitudinal section and Figure 2 a cross section on line 2—2 of Figure 1, of the fundamental elements of the invention, illustrating the principles thereof without limitation to any specific use. Figure 3 is a longitudinal section and Figure 4 a cross section on line 4—4 of Figure 3 showing the invention as applied to use for coupling sections of hose or tubing together. Figure 5 is a longitudinal section showing the invention embodied in an anchoring connection for a cable, and Figure 6 is a cross section of the same on line 6—6 of Figure 5. Figure 7 is a side view in elevation, partly broken away of a construction of clutch ring embodying one of the elements of the invention. Figure 8 is a section of the same ring taken on line 8—8 of Figure 7. Figure 9 is a sectional view showing the invention applied in a modified combination for connecting a hose to a valve or pump outlet. Figure 10 is a sectional view showing a modified form of the invention applied to clutch an electrical conduit or an insulated electrical conductor in an outlet or junction box. Figure 11 is a view similar to Figure 10 showing another form of the invention applied for the same purpose. Figure 12 is a plan view of the ferrule forming part of the combination as used in Figure 11. Figure 13 is a sectional view enlarged of the ferrule shown in Figure 12, the section being taken on line 13—13. Figure 14 shows the invention applied to hold a twisted pair of electrical conducting wires in an ordinary electrical fitting. Figure 15 shows the invention applied to connect a fire hose to a pipe line. Figure 16 shows it applied to secure a stopper in a bottle containing fluid under pressure and to provide a hermetic seal for the contents of the bottle. Figure 17 is a sectional view of a modified form of clutch ring. Figure 18 is a side view of one of the component disks of the clutch ring shown in Figure 17.

The same reference characters indicate the some parts in all the figures.

Referring first to Figures 1 and 2 which illustrate the essential features of the invention without reference to any specific use, $a$ represents a bar, $b$ represents a sleeve, ring, ferrule, or analogous member surrounding said bar, and $c$ represents a clutch ring. The bar $a$ and sleeve $b$ may be taken as typical of any two members which may require to be connected, and of which one surrounds the other, whereby a substantially coaxial arrangement exists between the members, and either of which may be subjected to force tending to move it longitudinally, that is, axially with relation to the other. The clutching or gripping member proper $c$ is a ring which surrounds the bar $a$ and occupies a recess or chamber $d$ in the sleeve. One of the bounding walls of the chamber is a tapered surface $e$ the elements of which make comparatively acute angles with the surface of the rod $a$. The other wall $f$ of the chamber is simply a confining wall and may be disposed in any manner effective to retain the binder ring $c$ therein. Preferably, however, it is nearly perpendicular to the axis of the parts $a$ and $b$.

As here shown the ring $c$ is circular is section, and is made of a material which is flexible, compressible, resilient and has a sufficient coefficient of friction. I find that vulcanized rubber compositions which are sufficiently soft and elastic to be stretched and twisted without being broken or permanently deformed, are suitable materials, but that other materials and constructions may be used as will be later set forth.

When the rod is moved to the right with respect to the sleeve, or the sleeve is moved to the left relatively to the rod, reference being had to the position of the arrangement of the parts shown in Figure 1, the friction between the clutch ring and the surfaces of the rod and sleeve cause the ring to be rolled along the surface $e$ toward the narrow end of the chamber $d$. The ring is thereby displaced axially and crowded radially toward the rod, being compressed against the latter with binding effect. This compression becomes greater in proportion to the increase in intensity in the force applied. To secure this binding effect the angle between the tapered and cylindrical faces of the sleeve and rod, respectively, must be more acute than the critical angle, which is the angle at which the ring will slip without binding upon one of the confining surfaces. The wall $f$ of the chamber is preferably less acute than the critical angle whereby the parts $a$ and $b$ may be moved relatively in the opposite direction freely and without being coupled.

It is not essential that the chamber having the inclined clutching wall be formed in the outer member of the coaxial pair, since it may be formed in the inner member or rod as well. The construction last mentioned is illustrated in connection with the sleeve $g$, which has a straight internal passage or bore, the rod or inner member then having a tapered surface $h$ terminating at a more or less abrupt shoulder $i$, thus forming the reversed equivalent of the chamber $d$, in which is seated a binding ring $j$. The mode of operation and the result of the construction last described are exactly the same as those of the first construction.

It is not essential that the inner member should be a solid rod, for it may be a tube or a ring or nipple of any sort, and it need not be cylindrical or even circular in cross section, for it may be polygonal or irregular within limits determined by the capacity of the binder ring to conform to its surface and to the complemental or different surface of the outer member.

In the action described, each section of the binder ring rolls about an annular axis. To permit this, the material of the ring, when it is made as a single integral piece, must be flexible enough to allow the inner circumference to become enlarged, and the outer circumference to become contracted. Vulcanized rubber compositions are known and commonly made which when molded into ring form are flexible and elastic enough to be turned inside out.

It is not essential for all purposes that the binder should be a continuous ring, for it may be a curved piece with ends either abutted or separated more or less. The function of binding and clutching is effectively performed by such a ring, although the function of packing to prevent leakage of fluid between the coaxial members requires the ring to be continuous and to have an uninterrupted surface. It is not necessary either that the radial sections of the ring be completely circular; but it is essential that their surfaces should not make extended contact with the gripping surfaces of the bar. These contacts should be tangent contacts of limited width, with the surfaces of the ring diverging progressively and increasingly from the clutching surfaces in order that the ring may roll when relative movement in the clutching direction occurs. Any shape of ring which permits substantially this character of rolling motion under the conditions described is within the scope of my invention.

I have previously stated that the binder may be made of other materials and structures than a ring or strip of vulcanized rubber. One of the possible other constructions is a helix of wire or ribbon stock bent into ring form with the ends either joined or left unconnected. Such a ring-formed helix having its ends connected is shown in Figures 7 and 8 and designated as a whole $c'$, while the wire forming it is designated $k$. The special form shown in these figures is further filled and coated with a vulcanized rubber composition in order that it may serve as a packing as well as a binder, and in order also to insulate the wire of the helix; but the binding or clutching function is performed as well by the bare helix as by the rubber filled and coated one.

Another form of the binder is shown in Figure 17 and consists of a ring-shaped core or axis $l$ and a number of disks $m$ threaded on such core. These disks may be of rubber composition, or of a less compressible material such as leather or leather substitutes, or various metals. It may be observed that where the binder is made of metal in either of the alternative forms described, or of other material having a smaller coefficient of friction than rubber, the angle between the clutching surfaces of the coaxial coupled members must be less than the greatest angle which will serve with a rubber binder.

When the clutch binder in the form shown in Figure 17 is used, the individual disks rotate about the core in rolling into the clutching position; and in the other forms the action of the adjacent connected sections of the continuous ring or band is essentially the same, such sections turning about an imaginary annular axis. The integral forms of binder first described may be considered as made up of an infinite number of disks in contact with one another without any intervening spaces.

The clutch thus described has the function of enabling the parts to be assembled by simply slipping one inside of the other, and conversely, slipping the outer member over the inner member, without hindrance, and of then preventing withdrawal of one part from the other by a direct pull however great, within the limits of the binding member to resist disintegration and extreme deformation or flow. It has this peculiarity, however, that withdrawal is possible by turning one member in or on the other at the same time that a gentle pull with slow movement is exerted in the withdrawing direction. That is, the binder will free itself, or fail to bind, when a twisting motion is given the one part relatively to the other; and this is a very desirable characteristic, because it enables the parts to be separated when desired, although they are so clutched that an undesired separation is impossible.

Many different uses may be served by the clutch having the characteristics just described. One use, shown in Figures 3 and 4, is that of connecting two sections of hose, or tubular members of any sort in alinement. The hose sections $n$ and $n'$ are inserted into the opposite ends of a coupling sleeve $o$, each of such ends being equivalent in form and function to the sleeve $b$, and having tapered interior chambers in which are confined binding rings $c^2$ and $c^3$ like either of the rings $c$ or $c'$ previously described. The rings not only clutch the tube ends in the coupling but they also pack them and prevent leakage of any fluid which may be conducted by the tubes.

Figure 5 shows the invention embodied in a cable connector and illustrates the manner in which the invention may be extended to transmit or withstand a force of any magnitude. The cable is designated $p$ and is contained in a sleeve made long enough to contain a large number of individual clutch elements, each consisting of a binder $c^4$ in a tapered cavity $d^4$ within the sleeve. The holding powers of the individual clutch elements are combined to develop a total holding power which is approximately equal to the power of one element multiplied by the number of elements. The connector here shown is provided with an eye for connection to any sort of an anchorage, and is made in two parts $q'$ and $q^2$ each part being grooved to contain half of the bore which receives the cable and half of each of the cavities containing the clutch rings. This divided construction enables the parts to be clamped tightly upon the cable and to add the holding power of friction to that of the clutch elements; while this construction also makes easier assembling of the eye with the cable. The ends of cables, particularly wire cables, are commonly bound with a seizing, as indicated at $r$, to prevent untwisting of the strands, and the presence of such a seizing makes impossible insertion of the cable endwise in a closely fitting sleeve. The parts of the sleeve or coupling are bound together by a tapered outer sleeve $s$ which is forced over the complemental tapered outer surfaces of the parts $q$ and $q'$, and is retained by a nut $t$, screwed upon the reduced and threaded end of these parts. The opposite ends of the parts of the connector are secured together by a bolt $u$ and nut $v$.

Figure 9 shows the invention applied to secure a hose in a permanent manner to a fixed nozzle. The hose is designated 21 and the fixed nozzle 22. The latter has a threaded flange 23 on its end upon which is screwed a sleeve nut 24 having a lip 25 interlocked with a flange 26 on a clutch sleeve 27. The latter embodies the principles of the sleeve $b$ originally described and is tapered to provide a contracted orifice fitting the hose and enclosing a conical annular space $d^5$ in which the binding ring $c^5$ is confined. A ferrule 28 is fitted within the clutch and provided with a flange 29 at one end beside the clutch ring, while its other end bears against the nozzle. 30 represents a packing washer between the nozzle and hose, and 31 represents a thimble provided to centralize the hose and confine the washer. When the sleeve nut 24 is moved outward to relieve the clutch ring, the hose end may be slipped through the ferrule 28 and over the thimble 31 and pressed against the washer 30. Then the hose is clutched initially by pulling it outward enough to cause gripping by the binder and it is made secure by screwing down the nut upon the nozzle until the ferrule 28 stops further movement. Thus the ferrule serves as an abutment to hold the binder in its clutching condition, preventing any such movement as would release the hose. It also makes a leakage tight joint by abutting at its inner end against the washer, supplementing the joint between the hose end and the washer. Any fluid which may leak between the hose and ferrule is checked by the binder ring. The abutment afforded by the ferrule makes the clutched union permanent beyond possibility of being released by relaxation of the tension or reversal in direction of the stress applied to the hose. But the hose may be withdrawn when desired by first unscrewing the nut 24 enough to relax the binder, and then giving the hose a twisting movement combined with a gentle pull. This combination is useful for any purpose where a tube is to be connected with a discharge nozzle, and is especially valuable to connect a hose to a gasoline pump in automobile service stations.

Figure 10 shows the invention applied to retain an insulated wire or a conduit for electrical conductors in outlets or junction boxes used in electric wiring systems. Here 32 represents a fragment of the box, 33 the conductor and 34 either a conduit or an insulated covering for the conductor. 35 is the post or screw through which the wire is connected in circuit. The opening in the box through which the conductor or conduit passes is surrounded by a conical flange 36 within which is confined a clutch binder $c^6$ which coacts with the flange or lip 36 and the part 34 to secure the latter in the same manner as already described. The binder is retained in place before the wire or conduit has been inserted, and also during insertion thereof from outside of the box, by a bead 37 which is connected to the binder by an annular web 38 and protrudes from the lip 36 and overlaps the edge thereof.

While the lip 36 above described is shown in Figure 10 as integral with the wall of the box, an equivalent construction is shown in Figure 11 where a separate ferrule 39 is placed in the hole. Such ferrule may be made by known methods from sheet metal and provided with a flange 40 on its inner end preventing it from being pulled out of the box, and with spring tongues 41 as shown in Figures 12 and 13, which prevent it from accidentally falling or slipping into the box, while permitting it to be easily put in place. These tongues are adapted to be bent down against the outer wall of the box. The ferrule has an inclined wall cooperating with the binder ring $c^7$ to prevent withdrawal of the conduit or wire as already described, and in addition its terminal lip 42 is turned outward to form an opposed clutching surface acting in conjunction with a second binder ring $c^8$ of appropriate size to prevent excessive entrance of the conductor and loosening of the interior clutch. This outer clutch is made to act by first pulling the wire or conduit outward as far as the compression of the ring $c^7$ will permit, and then placing the ring $c^8$ against the lip 42, whereupon the resilience of the ring 7 pulls back the conduit and causes the ring $c^8$ to bind.

A principle is involved in the feature last described which may be used with substantially all forms and applications of the clutch, and is of value as furnishing a means by which the clutched parts may be held in their bound condition after the tension or stress applied in binding them has been relieved. When the clutch contains only one pair of converging walls and an included binder, without means to resist movement of the inserted member toward the larger part of the space containing the binder, or of the embracing member in the opposite direction, a relative movement between the members in the direction last indicated releases the binder; and in conditions of use where stress is not constantly exerted tending to maintain the binding effect, it may happen that the clutch will accidentally be released, with possibly undersirable results. The principle embodied in the secondary clutch ring $c^8$ avoids all such results. Its efficacy depends on its being used with a main or primary clutch ring having capacity for a certain amount of resilient compression, enough to allow that extent of relative axial movement of the connected members in causing the main clutch ring to bind which will cause the secondary clutch ring to bind under the pull exerted by the primary ring in attempting to return to its unstrained form. A like result may be accomplished by tapering the binder ring chamber gradually in both opposite directions from its widest or deepest part, thus making the single binder effective to clutch the members with relative axial movement in either direction caused by simple direct stress, or by forming two tapering grooves with opposite inclinations of taper in the inner member, and providing binding rings in both grooves. Initial assembling of the members is permitted in either case by the fact that a telescoping movement compounded of rotation and a slow axial displacement under gentle stress is possible with this type of clutch, as already explained.

Figure 14 shows a mode of securing the wires of an electric circuit in a common electrical fitting, such for example as an electric light socket. The wires are designated 43 and the socket 44, the entrance thereto for the wire being a tubular neck 45 lined with an insulating bushing 46. The clutch binder is shown at $c^9$. The insulating bushings which are used with substantially all electrical fittings are finished at the ends in a manner which makes a rounded enlargement of the end of the bore. The surrounding walls thereby provide a tapering surface adapted to engage the flexible clutch ring and compress it against the wire in the manner previously described. The figure now under examination illustrates a special mode of applying the clutch ring to a twisted pair of wires, which consists in doubling the ring so that it makes two wraps around the wire and is thus caused to hug it closely and enter the depression between the twisted wires. It is not essential that the ring be doubled for this use, for it may be applied in a single wrapping as before described, but when doubled it acquires a more secure hold on the twisted wires and accomplishes the clutching function just as well. This application or embodiment of the invention holds the wires in the fitting and prevents a pull applied to them from being communicated to the binding screws by which they are electrically connected to the terminals of the fitting, and so obviates danger of the connection being broken. This use of the invention is applicable to a large number of electrical fixtures and connections without need of any changing in the fittings themselves.

Figure 15 shows the mode of connecting a fire hose to a water plug of any sort, such as the water pipe system of a factory, office building, ship, or other construction having a pipe system for contending with fires, or indeed the hydrants of an underground water supply system. 47 represents the hose, 48 the outlet nipple of the pipe system and 49 the controlling hand wheel of a shut-off valve. The nipple is enlarged or internally recessed to provide the chamber necessary to bind the ring $c^{10}$, and shaped with an abrupt shoulder 50 which enables the end of the hose to be readily inserted, and the tapered clutching surface 51 to cause compression of the ring by rolling into a contracted space when a direct pull is exerted tending to withdraw the hose. As hose of this character is readily collapsible, due to the flexible character of its construction and the small thickness of its wall in comparison with its diameter, and as its collapse would make the desired clutch effect impossible, the inserted end is reinforced by an inserted metallic ferrule 52, the outer end of which is curled around the edge of the hose to retain it in place and prevent raveling of the hose fabric, and the inserted part of which is long enough to pass through the binder ring when the hose end is fully inserted into the nipple. This reinforce insures firm coupling of the clutch by preventing collapse of the hose under the compressive force exerted by the binder ring resulting from the axial stresses applied to the hose by the water pressure. Other types of hose or tubing having considerable stiffness resistant to collapse, such as the hose shown in Figure 9 which has a helical wire lining 53, or metallic tubes and pipes, or garden hose which is made of a relatively thick wall and is additionally stiffened by a rubber lining or a waterproofing impregnation, do not require to be reinforced by such means as the ferrule last described.

Figure 16 shows the use of the invention to secure a stopper 54 in a bottle neck 55, and in the manner of this use here illustrated, the form of the invention which comprises a groove with a tapered surface formed in the inner member and a straight surface on the interior of the outer member, already discussed in connection with Figure 1, is shown. The stopper may be a solid plug of any impervious material or a shell closed at either or both ends. It has an encircling groove 56 containing the binder or clutch ring $c^{11}$, and the outer wall 57 at the side of the groove toward the mouth of the bottle is abrupt, whereby the stopper may be inserted without impediment, while the wall or surface 58 is inclined. Thus the ring is enabled to secure the stopper by the action already described, against withdrawal by axially applied force, and assuming that it is a complete ring made of somewhat compressible and impervious material, such as rubber, it packs the same as well as preventing escape of the contents of the bottle. It may be withdrawn at will, however, by first pushing it inward to relax the clutch ring, and then turning it and at the same time applying force gently in the axial direction outwardly. This stopper has been found to be an effective closure for bottles or other containers when holding carbonated beverages and other fluids exerting an elastic pressure greater than the external pressure; and it has been found that the stopper remains in place when the internal pressure is great enough to burst the container. Of course by especially constructing the bottle neck to provide the confining groove for the ring, in the manner of the sleeves and nipples previously described, particularly that of the sleeve $b$ shown in Figure 1, the stopper may be a straight plug, with like effect; but the form shown is preferred because thereby any ordinary bottle may be equipped with a hermetically sealed stopper so locked it can not be blown out.

In all of the forms or modifications and modes of use here illustrated or embraced within the scope of the foregoing disclosure, there are found a pair of substantially coaxial members consisting of an inner member and an outer member embracing it, together with a clutching binder or coupler. While in most cases the outer member will necessarily completely surround the inner member, yet the operation of the invention does not require that condition, and like results will follow where the outer member sufficiently embraces the inner member and sufficiently confines the clutch ring to effect compression of the latter between the members. The members of the pair are relatively movable and the commencement of such relative movement causes the binder or coupler to become effective to stop such movement. One of the members, permissibly either one, contains a groove or cavity in a zone transverse to the line of relative movement, in which groove or cavity the binder is confined. One of the bounding walls of such groove or cavity is necessarily inclined both to the line of relative movement and to the adjacent wall or surface of the other member at an angle to the latter surface which is less, or at least no greater, than the critical angle of friction, whereby the binder is caused to roll toward the more contracted end of the confining chamber when relative movement takes place in one direction; but the opposed wall of the recess or groove may be at any angle to the adjacent surface of the other member, preferably, however, making an angle which is greater than the critical angle of friction.

In the foregoing description and in the following claims the terms "binder," "coupler," or "ring," and expressions of like import include each of the forms of such ring hereinbefore specifically described, and include also not only complete rings which form a complete circuit, but also incomplete or partial rings or bands adapted to surround only partially the inner member of the pair.

A feature of much advantage is that the binder requires no retainer of any sort to hold it in place when the members of the pair are separated, whereby the clutch construction is of the utmost simplicity, and whereby also the members of the pair may be wholly separated, but left in condition for instant coupling upon reassembling.

What I claim and desire to secure by Letters Patent is:

1. A binder or coupler for the purpose set forth comprising a helix of wire formed into ring shape, such helix being filled and coated with rubber composition.

2. The combination with inner and outer members, the outer member having inner surfaces inclined toward the inner member in opposite directions, of clutch rings surrounding the tube and respectively engaging the gripping inclined surfaces, each of said clutch rings being of resilient compressible material formed to roll in contact with the surfaces between which it is located; the two clutch rings coacting to restrain the aforesaid members from relative axial movement in either direction.

3. A clutch for axial traction comprising inner and outer members arranged for relative movement in the axial direction, one of said members having oppositely inclined circumferential surfaces converging toward the contiguous surface of the other member and forming therewith included tapering chambers or grooves, and flexible binder rings contained in said chambers constructed to roll on the bounding surfaces thereof when axial relative movement takes place, one of said rings being resiliently compressible.

In testimony whereof I have affixed my signature.

WARREN NOBLE.